June 15, 1965  W. F. ISLEY  3,189,010
PISTON FOR INTERNAL COMBUSTION ENGINE
Filed Nov. 21, 1963  3 Sheets-Sheet 1
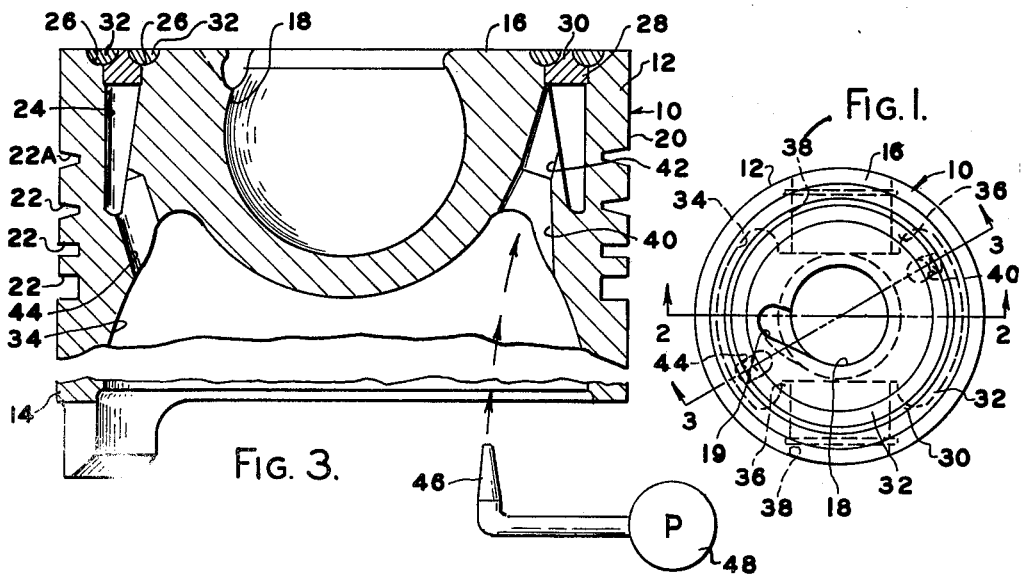
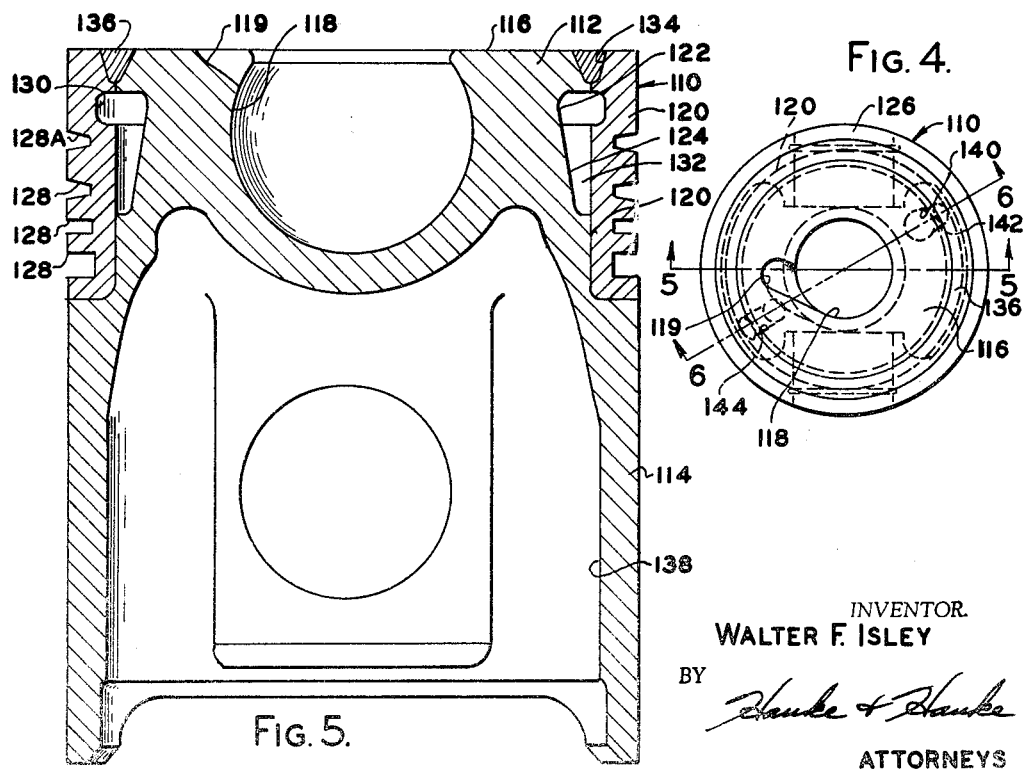
INVENTOR.
WALTER F. ISLEY
BY
ATTORNEYS

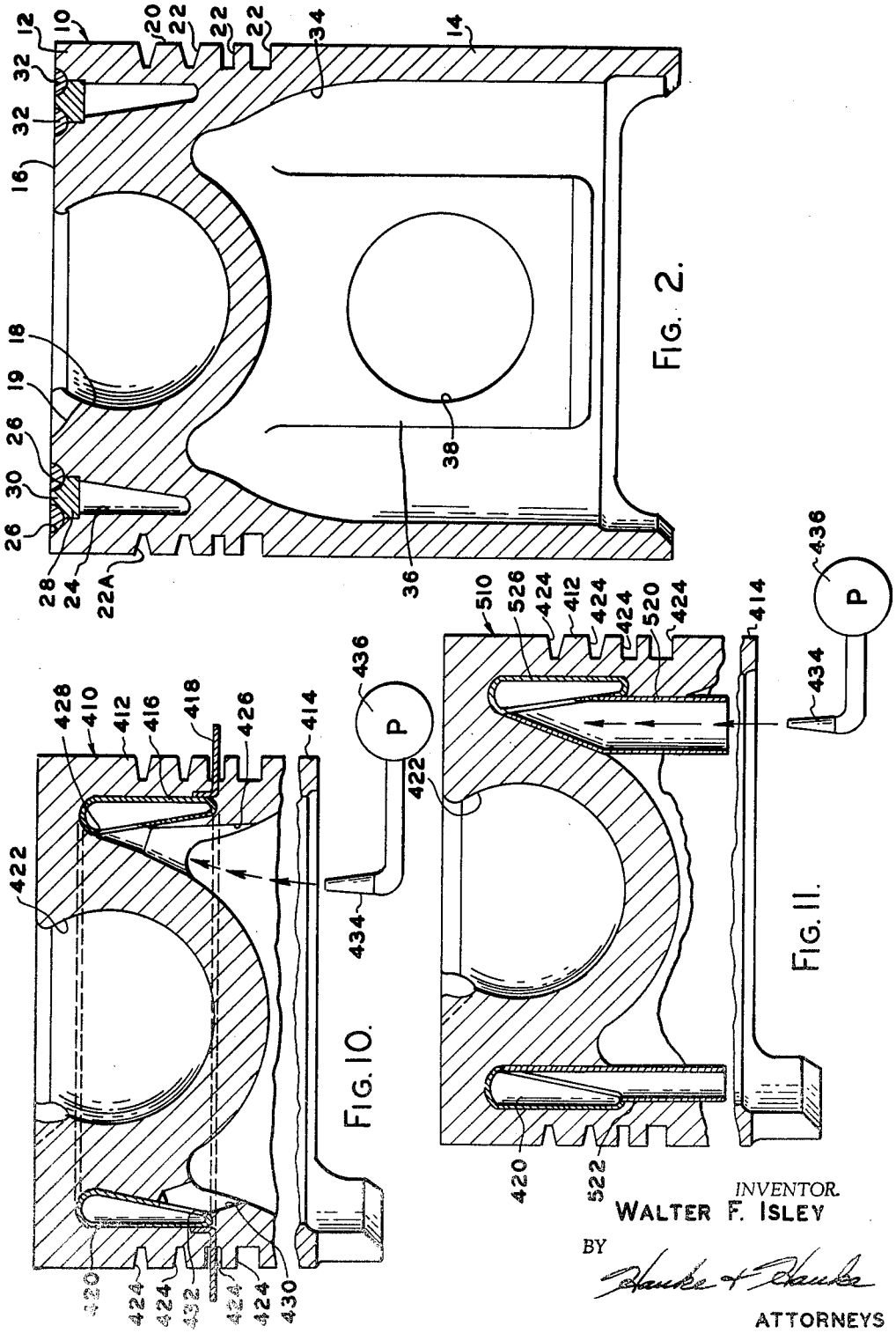

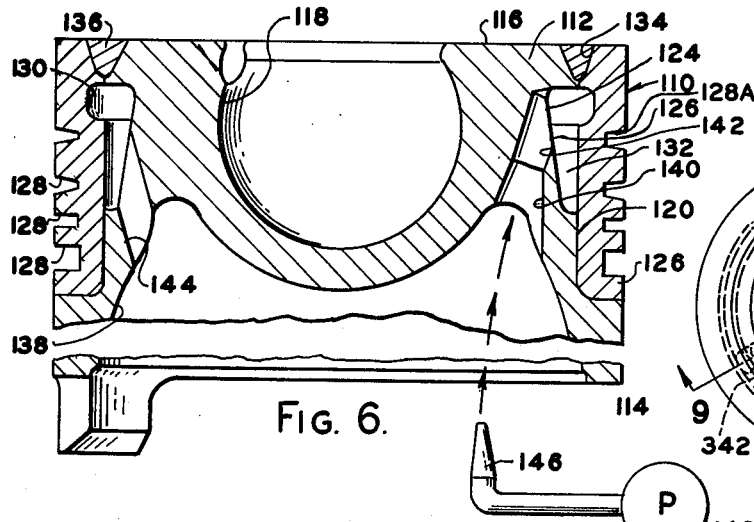
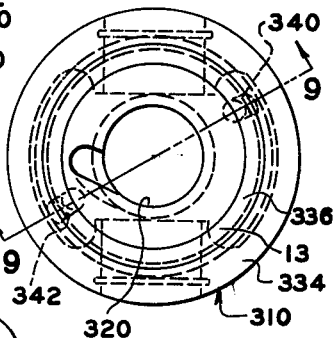
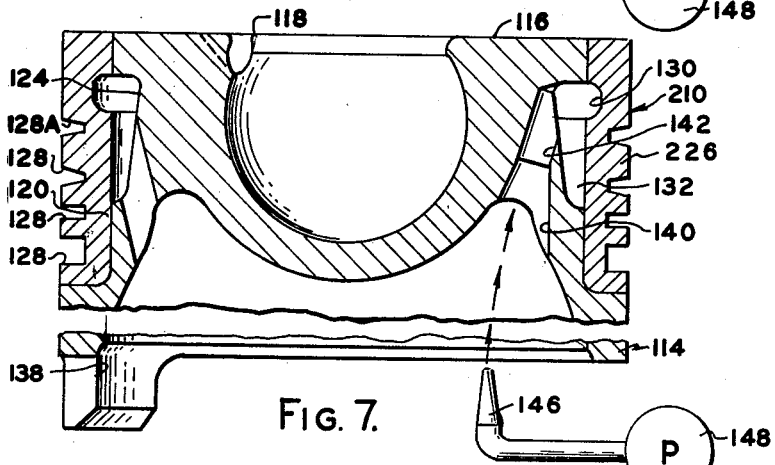
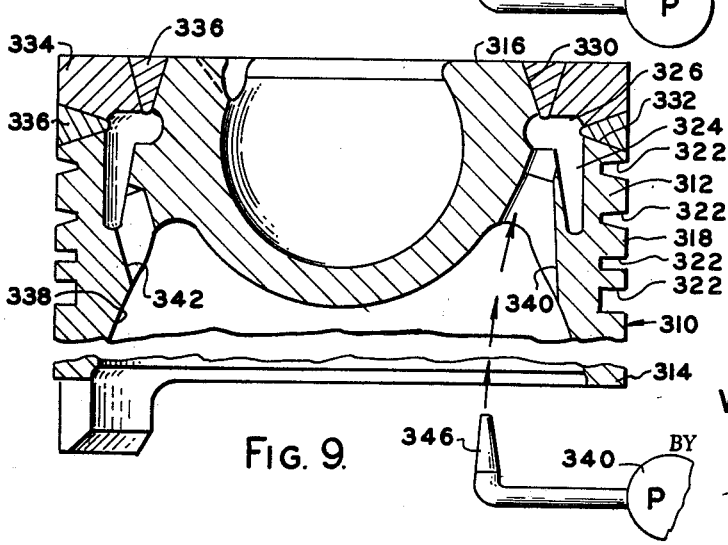

United States Patent Office 3,189,010
Patented June 15, 1965

3,189,010
PISTON FOR INTERNAL COMBUSTION ENGINE
Walter F. Isley, Grosse Pointe, Mich., assignor to Continental Aviation and Engineering Corporation, Detroit, Mich., a corporation of Virginia
Filed Nov. 21, 1963, Ser. No. 325,271
10 Claims. (Cl. 123—41.35)

The present invention relates to internal combustion engines and more particularly to a piston for such engines provided with means for cooling the vicinity of the piston rings carried by the piston.

The present invention is especially applicable to those internal combustion engines in which the combustion chamber is arranged entirely or substantially within the face of the piston although as the description proceeds it will be apparent that the construction of the present invention can be used with other types of pistons as well.

The advantages of providing the combustion chamber within the face of the piston have been known for some time. The most desirable shape for such a combustion chamber is in the form of the major portion of a spherical hollow space or cavity extending well into the head of the piston.

Because the combustion chamber extends below the ring groove area of the piston and is separated from this area by a relatively thin wall of material, the intense heat produced in the combustion chamber is readily transmitted to the ring groove area. High temperatures in this area cause warping or distortion of the piston rings and if the temperatures are in excess of the coking temperature of the fuel being used to operate the engine deposits will be produced especially in the area of the top ring groove. Either of these conditions will produce scoring of the cylinder.

The present invention overcomes this problem by providing a closed cavity disposed intermediate the combustion chamber and the ring groove area and means for supplying a cooling fluid to this cavity. Several alternate methods of forming the cavity are disclosed.

It is an object then of the present invention to produce a more efficient internal combustion engine by providing a piston having a cavity closely adjacent the ring groove area and means for circulating a cooling fluid through the cavity.

Other objects and advantages will readily occur to one skilled in the art to which the invention pertains upon reference to the following drawings illustrating several preferred embodiments in which like references characters refer to like parts throughout the several views and in which—

FIG. 1 is a top elevational view of a preferred piston of the present invention.

FIG. 2 is a cross sectional view taken substantially on line 2—2 of FIG. 1

FIG. 3 is a fragmentary cross sectional view taken substantially on line 3—3 of FIG. 1 showing some parts schematically to more clearly illustrate the present invention.

FIG. 4 is a top elevational view of another preferred piston of the present invention.

FIG. 5 is a cross sectional view taken substantially on line 5—5 of FIG. 4.

FIG. 6 is a fragmentary cross sectional view taken substantially on line 6—6 of FIG. 4 and illustrating some structure schematically for purposes of clarity.

FIG. 7 is a view similar to FIG. 6 but illustrating another preferred embodiment of the present invention.

FIG. 8 is a top elevational view of yet another preferred embodiment of the present invention.

FIG. 9 is a fragmentary cross sectional view taken substantially on line 9—9 of FIG. 8 and illustrating some structure schematically for purposes of clarity.

FIG. 10 is a fragmentary cross sectional view similar to FIG. 9 but illustrating still another preferred embodiment of the present invention and—

FIG. 11 is a fragmentary sectional view similar to FIG. 10 but illustrating still another preferred embodiment of the present invention.

Description

Now referring to the drawings for a more detailed description of the present invention FIGS. 1–3 illustrate a preferred piston 10 as comprising a head portion 12 and a skirt 14. The head portion 12 is provided with a face 16 and a substantially spherical combustion chamber cavity 18 is formed in the head portion 12 and is intersected by the face 16 as shown. A groove is provided in the face 16 as can best be seen in FIG. 1 to direct fuel from an injector nozzle (not shown) into the combustion chamber cavity 18. The substantially annular exterior surface 20 of the head portion 12 is provided with a plurality of axially spaced ring grooves 22 and a top ring groove 22A. Each of the grooves 22 and the groove 22A is adapted to carry a piston ring (not shown). An annular cavity 24 is provided in the face 16 and extends into the head portion 12 to a position intermediate the combustion chamber 18 and the surface 20 closely adjacent the area of the ring grooves 22 and 22A. The upper portion of the cavity 24 is enlarged somewhat as shown to form shoulders 26. A closure ring 28 is carried on the shoulders 26 and is provided with a raised rib portion 30. The ring 28 is preferably secured in a position closing the cavity 24 by weld 32 provided on each side of the rib portion 30.

The skirt 14 is preferably hollow as shown to provide a substantially annular recess 34. Wrist pin bosses 36 extend radially inwardly from opposite sides of the recess 34 and are provided with axially aligned openings 38. The openings 38 are adapted to receive a wrist pin (not shown).

As can best be seen in FIGS. 1 and 3 a conical inlet 40 is provided in head portion 12. The inlet 40 provides communication between the recess 34 and a passage 42 which registers with the upper portion of the cavity 24 as shown. An outlet 44 provided in the head portion 12 and positioned oppositely from the inlet 40 provides communication between the lower portion of the cavity 24 and the recess 34. A nozzle 46 is positioned to direct a cooling fluid preferably oil from the engine's oil pump 48 through the conical inlet 40 and into the cavity 24.

Another preferred piston construction is illustrated in FIGS. 4–6 as comprising a piston 110 having a head portion 112 and a skirt 114. The head portion 112 is provided with a face 116, a combustion chamber cavity 118 and a grove 119 similar to those described above with reference to FIGS. 1–3 are provided in the head portion 112. The exterior surface of the head portion 112 is preferably formed as shown to provide a reduced portion 120. Recesses 122 and 124 are provided in the reduced portion 120 as can best be seen in FIGS. 5–6.

An annular member 126 preferably constructed of a high temperature material such as stainless steel is adapted to seat in the reduced portion 120 to form a surface substantially flush with the exterior surface of the skirt 114 as shown. The annular member 126 is provided with a plurality of axially spaced piston ring grooves 128 and a top ring groove 128A on the exterior surface thereof. Each of the grooves 128–128A is adapted to carry a piston ring (not shown). An annular recess 130 is provided on the interior surface of the annular member 126 in a position closely adjacent the top ring groove 128A and in registry with the annular recess 122 so that the recess 122 and 130 provide a substantially annular cooling cavity 132 positioned in the head portion 112 intermediate the combustion chamber cavity 118 and the ring grooves 128–128A. A portion 134 of the annular member 126 is removed adjacent the recess 122. The annular member 126 is preferably secured to the piston 110 by weld 136.

The skirt 114 is substantially similar to the skirt 14 described above and is hollow as shown to provide a recess 138. A conical inlet 140 is provided in the head portion 112 with the wider section thereof opening to the recess 138. A passage 142 communicates with the inlet 140 and registers with the upper portion of the cavity 132. An outlet 144 is also provided in the head portion 112 substantially opposite the inlet 140 and provides communication between the lower portion of the cavity 132 and the recess 138. A nozzle 146 adapted for connection to the oil pump 148 of the engine directs a stream of oil through the conical inlet 140 and into the cavity 132.

FIGURE 7 illustrates an embodiment similar to the embodiment described with reference to FIGS. 4–6 except that the annular member 226 is preferably press fitted to the piston 210. The annular member 226 is preferably constructed of a material having a higher coefficient of thermal expansion than the piston 210. In this way a more constant interference fit is maintained during engine operation and stresses are reduced under high temperature conditions.

FIGS. 8–9 illustrate yet another preferred embodiment of the present invention similar to the embodiments described above and comprising a piston 310 having a head portion 312 and a skirt portion 314. The head portion 312 is provided with a face 316 and exterior annular surface 318. A combustion chamber cavity 320 is provided in the face 316 and a plurality of piston ring grooves 322 is provided on the surface 318. The annular corner at the juncture of the face 316 and the surface 318 is preferably removed and formed to provide an axially extending annular cavity 324 having an enlarged upper portion 326. Spaced shoulders 328 and 330 are formed and an annular seat portion 322 is formed in the head portion 312. A corner ring member 334 is adapted to be seated on the seat portion 332 and to be secured thereto and a shoulder 330 by welding as shown at 336. The corner ring member 34 closes the cavity 324.

The skirt 314 is hollow to provide an annular recess 338. A conical inlet 340 substantially as described above is provided in the head portion 312 to communicate with the upper enlarged portion 326 of the cavity 324. An outlet 342 is provided in the head portion 312 annularly spaced from the inlet 340 and provides communication between the lower portion of the cavity 324 and the recess 338. A nozzle 346 connected with the oil pump 340 of the engine directs a stream of oil through the inlet 340 and into the cavity 324.

FIG. 10 illustrates yet another preferred embodiment of the present invention in which a piston 410 comprises a head portion 412 and a skirt portion 414. A torroidal shaped hollow member 416 is preferably positioned in the head portion 412 by tabs 418 and the piston 410 is molded around the member 416. The portion of the tabs 418 which extend beyond the surface of the head portion 412 is then removed. The member 416 provides an enclosed interior chamber or cavity 420 positioned in the head portion 412 intermediate the combustion chamber cavity 422 and the piston ring grooves 424. A conical inlet 426 is provided in the head portion 412 and registers with an opening 428 provided in the member 416. The opening 428 communicates with the upper portion of the cavity 420. An outlet 430 is provided in the head portion 412 in a position annularly spaced from the outlet 426 and registers with an opening 432 provided in the lower portion of the member 416. A nozzle 434 is connected with the oil pump 436 of the engine and directs a stream of oil through the inlet 426 and into the cavity 420.

FIG. 11 illustrates a preferred piston 510 similar to the embodiment shown in FIG. 10 except that a tubular inlet 520 and a tubular outlet 522 are provided in the hollow member 526. This eliminates the need for the tab portions to retain the hollow member 526 in position while the piston 510 is molded around the member 526. The tubular inlet 520 and outlet 522 can be used to position the member 526 during the casting process.

In each of the embodiments described above oil is delivered from the oil pumping system of the engine and by the nozzles through the inlet and into the cavity provided between the combustion chamber and the area of the ring grooves. The conical shape of the inlet insures that most of the oil will be delivered to the cavity at any position of the piston. By positioning the inlet high in the cavity and the outlet in registry with the lower portion of the cavity a substantial portion of the oil will be moved annularly through the cavity to the outlet to provide the necessary cooling. The reciprocal movement of the piston during engine operation contributes to the circulation of the oil through the cavity.

The cooling produced by the piston constructions of the present invention produces a reduction in operating temperatures in the area of the piston ring grooves and especially in the vicinity of the top ring groove. This reduction in temperatures reduces ring groove deposits caused when temperatures in this area exceed the coking temperature of the fuel being used.

It is apparent that although I have described several embodiments of the present invention, many other changes and modifications can be made without departing from the spirit of the invention as expressed by the appended claims.

I claim:

1. In an internal combustion engine a piston assembly comprising
 (a) a piston member and a ring member secured to said piston member,
 (b) said piston member having a head portion and said head portion having a combustion chamber cavity and an annular cavity spaced from and substantially encompassing said combustion chamber cavity,
 (c) said ring member being provided with a plurality of axially spaced piston ring grooves and being positioned to close said annular cavity,
 (d) said ring member being constructed of a high temperature material such as stainless steel, and
 (e) means delivering a coolant to said annular cavity.

2. In an internal combustion engine a piston assembly comprising
 (a) a piston member and a ring member secured to said piston member,
 (b) said piston member having a head portion and said head portion having a combustion chamber cavity and an annular cavity spaced from and substantially encompassing said combustion chamber cavity,
 (c) said ring member being provided with a plurality of axially spaced piston ring grooves and being positioned to close said annular cavity,
 (d) said piston member and said ring member being constructed of materials having different coefficients of expansion with the material of said ring member being of a higher coefficient of expansion than the material of said piston member, and
 (e) means delivering a coolant to said annular cavity.

3. The piston assembly as defined in claim 2 and in which said means comprises.
 (a) a conical inlet provided in said head portion and registering with said closed cavity,
 (b) an outlet provided in said head portion substantially radially opposite said inlet and registering with said closed cavity, and (c) a nozzle adapted for connection to the oil supply means of the engine and positioned to direct a stream of oil into said inlet.

4. The piston assembly as defined in claim 3 and in which said inlet registers with said closed cavity axially higher than the registry of said outlet with said closed cavity.

5. The assembly as defined in claim 1 and in which said means comprises
  (a) a conical inlet provided in said head portion and registering with said closed cavity,
  (b) an outlet provided in said head portion substantially radially opposite said inlet and registering with said closed cavity, and
  (c) a nozzle adapted for connection to the oil supply means of the engine and positioned to direct a stream of oil into said inlet.

6. The assembly as defined in claim 1 and in which said delivering means comprises
  (a) an inlet provided in said head portion and registering with the upper portion of said closed cavity,
  (b) an outlet spaced from said inlet and registering with the lower portion of said closed cavity, and
  (c) means directing a stream of oil into said inlet.

7. The assembly as defined in claim 1 and in which said last mentioned means comprises,
  (a) a source of oil under pressure and
  (b) a nozzle axially aligned with said inlet and connected with said source of oil under pressure.

8. The piston assembly as defined in claim 1 and in which said ring member is fusion welded to said piston member.

9. The piston assembly as defined in claim 1 and in which said ring member is secured to said piston member by a press fit.

10. The piston assembly as defined in claim 1 and in which said ring member is provided with said piston ring grooves.

References Cited by the Examiner

UNITED STATES PATENTS

| | | | |
|---|---|---|---|
| 2,369,906 | 2/45 | Moore | 123—41.38 |
| 2,800,119 | 7/57 | Schmidl | 123—41.35 |

FOREIGN PATENTS

| | | |
|---|---|---|
| 1,244,722 | 1/60 | France. |
| 1,246,794 | 10/60 | France. |
| 1,001,862 | 1/57 | Germany. |
| 802,480 | 10/58 | Great Britain. |

RICHARD B. WILKINSON, *Primary Examiner.*

KARL J. ALBRECHT, *Examiner.*